(12) United States Patent
Forbes

(10) Patent No.: US 10,278,537 B2
(45) Date of Patent: May 7, 2019

(54) COMPACT VERSATILE PORTABLE COOKER

(71) Applicant: Angus P. Forbes, Cedarburg, WI (US)

(72) Inventor: Angus P. Forbes, Cedarburg, WI (US)

(73) Assignee: Shari A. Forbes, Cedarburg, WI (US)

( * ) Notice: Subject to any disclaimer, the term of this patent is extended or adjusted under 35 U.S.C. 154(b) by 218 days.

(21) Appl. No.: 14/747,921

(22) Filed: Jun. 23, 2015

(65) Prior Publication Data
US 2016/0374507 A1    Dec. 29, 2016

(51) Int. Cl.
*A47J 37/04*    (2006.01)
*A47J 37/07*    (2006.01)

(52) U.S. Cl.
CPC ......... *A47J 37/041* (2013.01); *A47J 37/0763* (2013.01)

(58) Field of Classification Search
CPC .................. A47J 37/04; A47J 37/07
USPC ...... 99/421 H, 449, 482, 421 HV; 126/25 A, 126/9 R, 25 B, 38, 25 R
See application file for complete search history.

(56) References Cited

U.S. PATENT DOCUMENTS

| | | | |
|---|---|---|---|
| 2,114,698 A * | 4/1938 | Babin ..................... | A47J 37/06 126/14 |
| 2,627,854 A | 2/1948 | Sava | |
| 2,477,529 A | 7/1949 | Sprinkle et al. | |
| 3,503,324 A | 3/1970 | Gmeiner | |
| 3,839,050 A | 10/1974 | Gordon | |
| 3,845,753 A * | 11/1974 | Jackson ............ | A47J 37/0786 126/9 R |
| 3,943,837 A | 3/1976 | Trkla | |
| 4,108,055 A | 8/1978 | Simmons | |
| 4,158,992 A | 6/1979 | Malafouris | |
| 4,492,215 A * | 1/1985 | DiGianvittorio ... | A47J 37/0704 126/25 R |
| 4,508,096 A | 4/1985 | Slattery | |
| 4,569,327 A | 2/1986 | Velten | |
| 4,572,062 A | 2/1986 | Widdowson | |
| 4,598,690 A | 7/1986 | Hsu | |
| 4,721,037 A * | 1/1988 | Blosnich ............. | A47J 37/0704 126/25 R |
| 4,869,228 A * | 9/1989 | Sorensen ............ | A47J 37/0704 126/216 |
| 5,070,857 A | 12/1991 | Sarten | |
| 5,105,726 A * | 4/1992 | Lisker ................. | A47J 37/0763 99/340 |
| 5,205,207 A | 4/1993 | McGuire | |
| 5,878,739 A | 3/1999 | Guidry | |
| 5,891,498 A * | 4/1999 | Boehler ................ | A23B 4/052 126/25 R |
| 6,439,111 B1 | 8/2002 | Lu | |
| 6,823,858 B1 | 11/2004 | Chen | |
| 6,935,326 B1 | 8/2005 | Willis | |
| 8,752,539 B2 | 6/2014 | Paap et al. | |

(Continued)

*Primary Examiner* — Michael A Laflame, Jr.
(74) *Attorney, Agent, or Firm* — James Earl Lowe, Jr.

(57) ABSTRACT

A compact versatile portable cooker comprising a fire pan, a cover, and a pair of support racks adapted to support a spit and adapted to be attached to the opposed ends of the fire pan. Front and back plates are hinged to the fire pan, and one can alternately either secure the cover or the support racks to the fire pan, to provide with the cover a dosed container for containing and storing all of the parts of the portable cooker; and to provide with the support racks a support for the spit above the fire pan.

12 Claims, 7 Drawing Sheets

(56) References Cited

U.S. PATENT DOCUMENTS

| | | | |
|---|---|---|---|
| 2002/0017290 A1* | 2/2002 | Hines, Jr. ................ | A47J 37/01 |
| | | | 126/41 R |
| 2003/0217647 A1* | 11/2003 | Jones .................... | G06Q 10/10 |
| | | | 99/450 |
| 2010/0300425 A1* | 12/2010 | Rees, Jr. ............. | A47J 37/0786 |
| | | | 126/25 R |
| 2012/0234308 A1* | 9/2012 | Faulk .................. | A47J 37/0713 |
| | | | 126/25 R |
| 2014/0069411 A1* | 3/2014 | Huang ................ | A47J 37/0704 |
| | | | 126/25 R |

* cited by examiner

COMPACT VERSATILE PORTABLE COOKER

BACKGROUND

This invention relates to a rotisserie grill and more particularly to a portable cooker which is adapted for roasting and baking relatively large items of food, such as small pigs or the like, on a rotating spit.

SUMMARY

Disclosed is a compact versatile portable cooker comprising a fire pan, a cover, and a pair of support racks adapted to support a spit and adapted to be attached to the opposed ends of the fire pan. Front and back plates are hinged to the fire pan, and one can alternately either secure the cover or the support racks to the fire pan, to provide with the cover a closed container for containing and storing all of the parts of the portable cooker; and to provide with the support racks a support for the spit above the fire pan.

Figure 1:
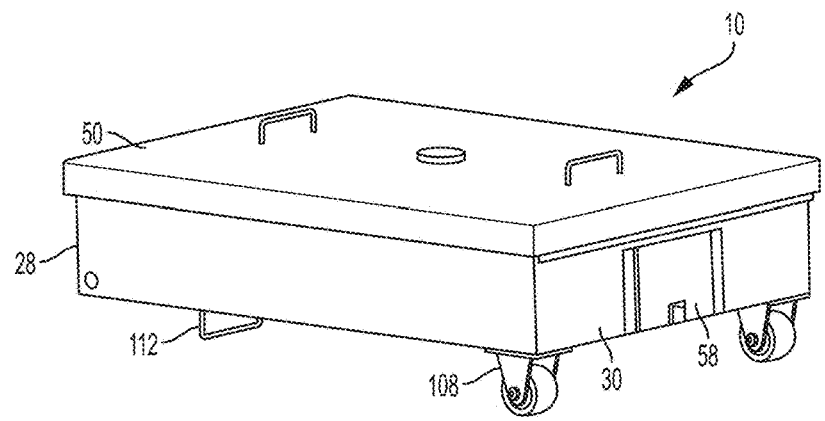
FIG. 1 is a top perspective view of a compact portable cooker according to this disclosure.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward", "downward", "side", "top" and "bottom", etc., are words of convenience and are not to be construed as limiting terms.

DESCRIPTION OF THE EMBODIMENT

Illustrated in the drawings is a compact versatile portable cooker 10 including a fire pan 14, and front 18, back 22, and side plates 34 and 34'. The cooker 10 also includes a support rack 26 at each of opposed ends 28 and 30 of the fire pan 14. The cooker 10 can be used to roast meat on a spit 38 (see FIG. 10), varying the height of the spit 38 above the fire pan 14, or grill with an optional grill (not shown) placed at various levels inside the cooker 10, spaced from the fire pan 14. The cooker 10 can also be used for baking and smoking food. The fire pan 14 is of a rectangular configuration and has a bottom 42 and four sides 46. The cooker 10 also includes a cover 50. The support racks 26 are small enough to fit into the fire pan 14 for storage and transportation. The cover 50 is dimensioned to fit over the front 18, back 22, and side plates 34 and 34', as well as the support racks 26, to enclose the top of the cooker 10, when desired.

Figure 8:
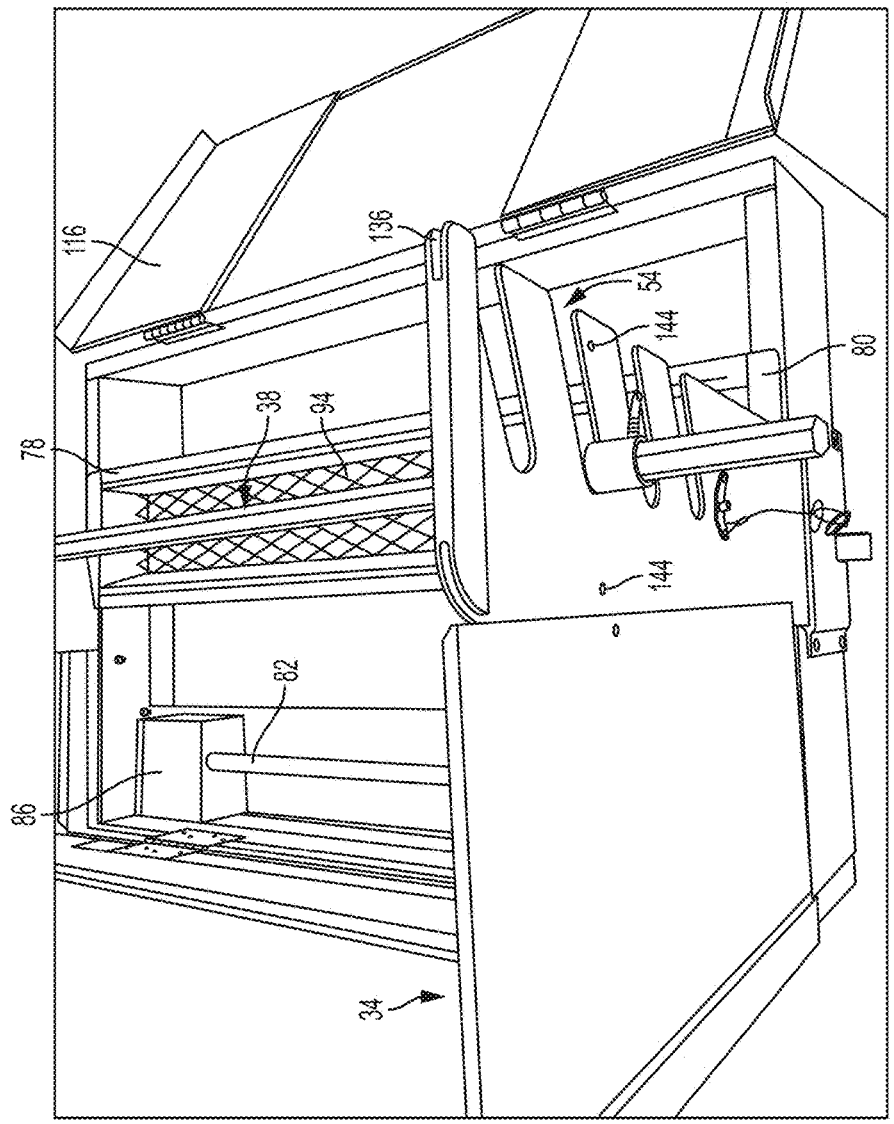
FIG. 8 is a top perspective view of the cooker of FIG. 1, with the front plate down and a rearward side plate about to be inserted into a notch in the support rack.

As shown in FIG. 8, the cooker support racks 26 also include means for supporting the spit at several different cooking levels above the fire pan 14. More particularly, each of the supporting support racks 26 include a plurality of spaced apart angled notches 54 adapted to receive the spit 38 so that the spit 38 can be positioned at various levels above the fire pan 14. Preferably, the length of each support rack 26 is such that it can fit from end to end inside the fire pan 14 for storage and transportation.

Figure 2:
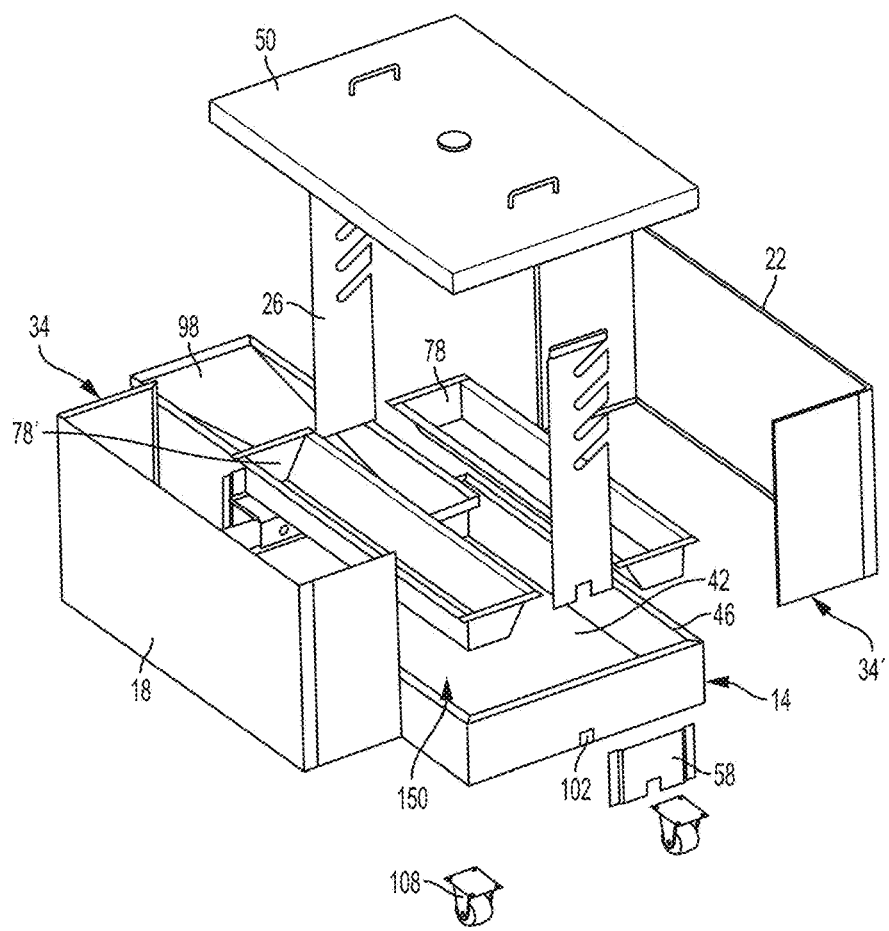
FIG. 2 is a top perspective exploded view of the cooker of FIG 1.
Figure 3:
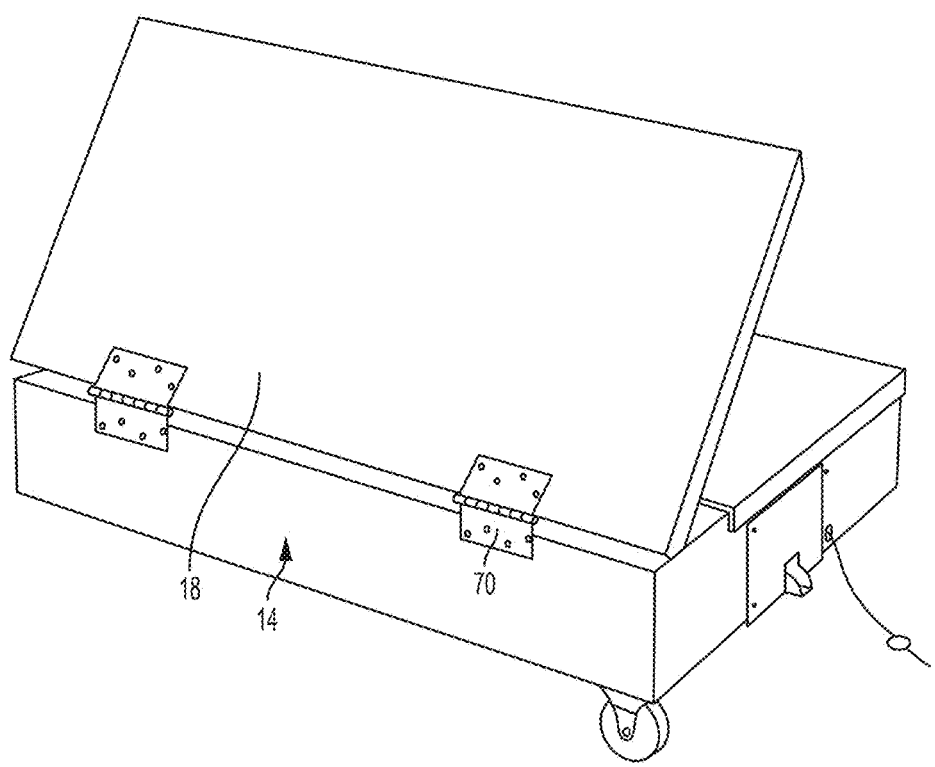
FIG. 3 is a top perspective view of the cooker of FIG. 1, with the cover removed and the front plate pivoted partially upward.
Figure 6:
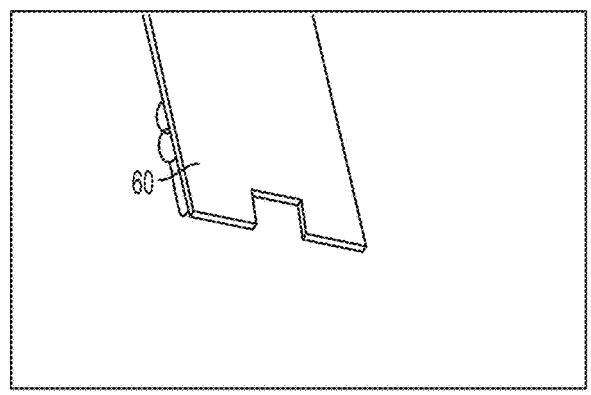
FIG. 6 is in an end view of the end of the support rack.
Figure 9:
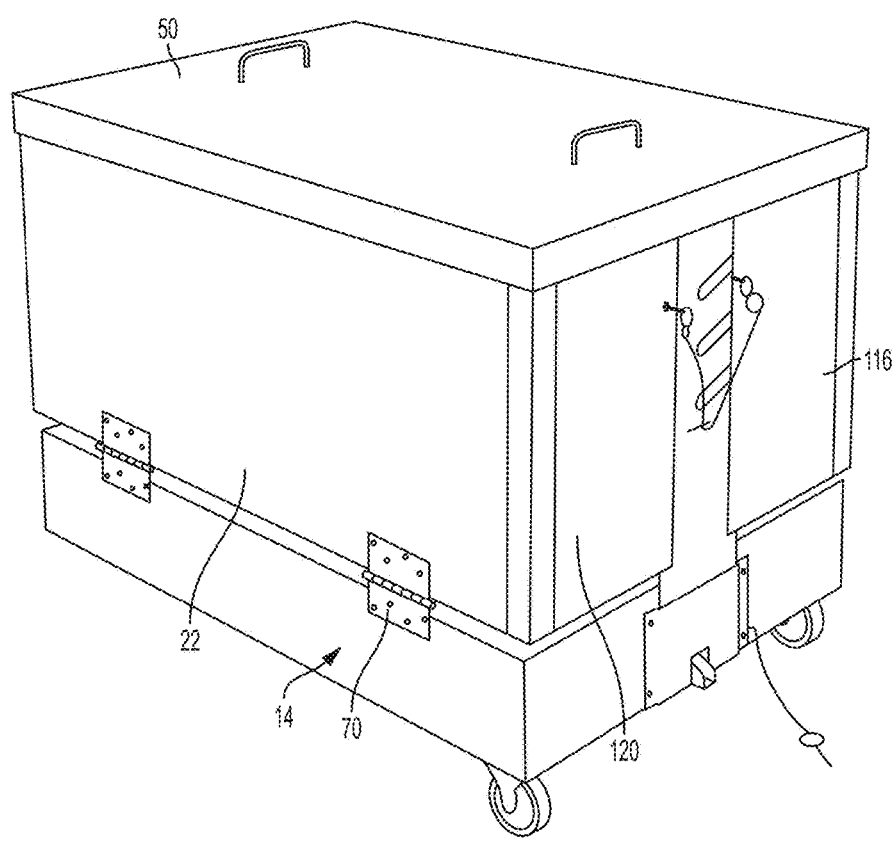
FIG. 9 is a top perspective view of the cooker in its fully assembled state.

As shown in FIGS. 2 and 9, the fire pan 14 includes outside support rack receiving pockets 58, and one end 60 (see FIG. 6) of each of the support racks 26 is adapted to be received in a respective one of the fire pan pockets 58. The support racks 26 are configured to be placed in the pockets 58 so that the spit receiving notches 54 on both support racks 26 are open toward the front of the cooker 10. When received in the pockets 58, the support racks 26 are supported vertically by both the sides of the fire pan 14 and by the pockets 58.

Figure 11:
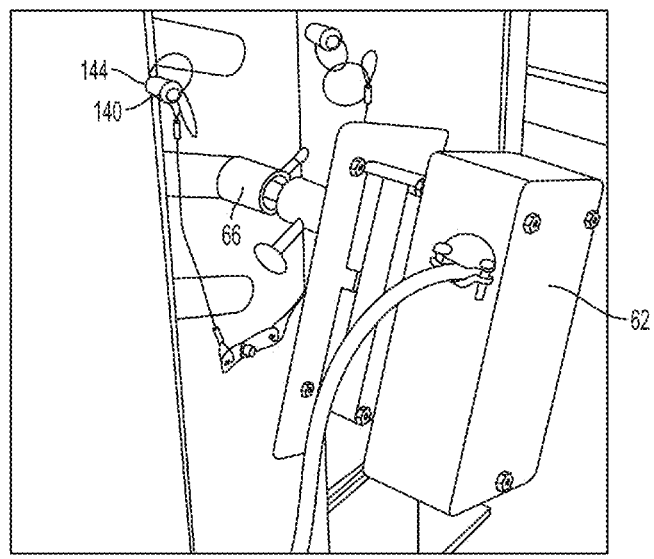
FIG. 11 is a perspective view of an electric motor attached to the end of the spit to rotate the spit.

The spit 38 is an elongated bar that is adapted to extend from one supporting support rack 26 to the other support rack 26, extending at each end just past the respective support rack. Preferably, the length of the spit 38 is such that it can fit from one corner to the other corner in the fire pan 42 for storage and cooker transportation. The cooker 10 also includes an electric motor 62 (see FIG. 11), for rotating the spit 38, connected to one end of the spit 38. The electric motor 62 can be operated by either AC or DC power, providing ease of use of the cooker 10 away from an electrical outlet. In other embodiments (not shown), a hand crank can be used to rotate the spit 38.

Figure 10:
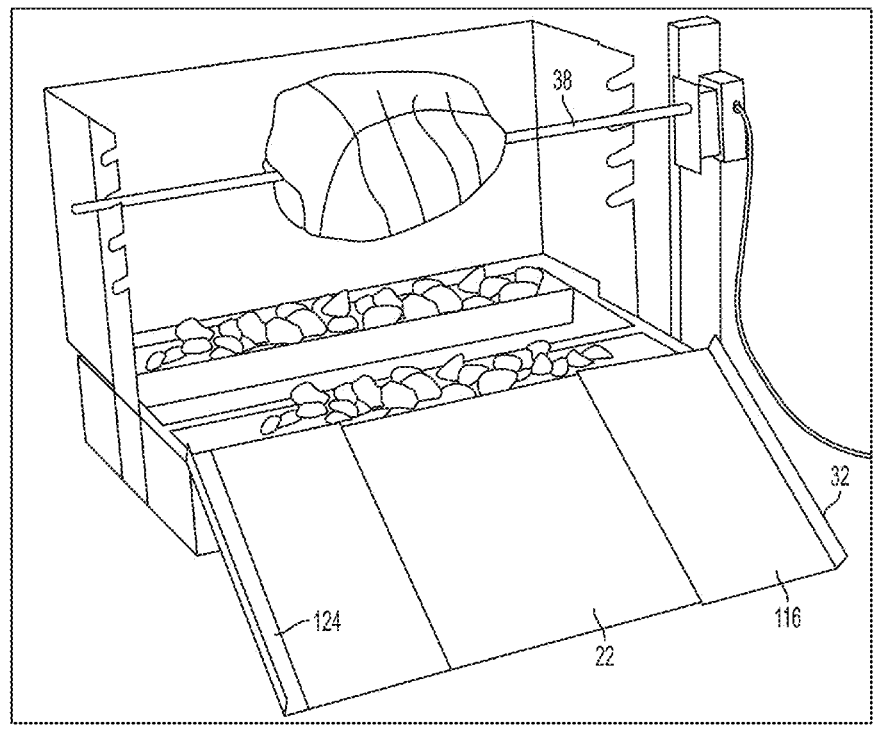
FIG. 10 is a front perspective view of the cooker with the front plate down, and a roast mounted on the spit in the cooker.

As shown in FIG. 9, the cooker 10 also includes the front 18 and back 22 plates hinged by spaced apart hinges 70 to the fire pan 14. The hinges 70 connecting the front and back plates to the fire pan space the plates apart from the fire pan to provide vents between the fire pan and the bottom of the plates for allowing air into the inside of the cooker 10. In less preferred embodiments, vent holes (not shown) can also be provided in the fire pan, as an alternative to the spacing of the plates from the fire pan or in addition thereto. As illustrated in FIG. 10, the front 18 and back 22 plates can be in either an up or out and down position. When both of the front and back plates, as well as the side and support racks, are in the up position, more heat is contained in the cooker 10, making it easy to use as an oven. And when the front plate 18 is down, as shown in FIGS. 9 and 10, the spit 38 is readily accessible and the cooker 10 can be used as an open pit cooker.

As shown in FIG. 8, heat for cooking is provided by either a gas burner 74 in the fire pan 14, or a charcoal tray 78 in the fire pan 14, or both the gas burner 74 and the charcoal tray 78, or alternately, the gas burner 74 and the charcoal tray 78. This dual heat source provides a cooker 10 with the ease and versatility of a gas grill, while at the same time allowing for the smoky flavor offered with the use of charcoal or wood. The gas burner 74 includes a gas tube 82 mounted within the fire pan 14, and a gas flow rate control 86 with a knob accessible from outside of the fire pan 14.

As shown in FIG. 8, the charcoal tray 78 is movable in the fire pan 14 and removable from the fire pan 14. More particularly, the ends of the trays include extensions 80 that sit on top of the end walls of the fire pan 14. This permits the charcoal to be located either directly under the spit 38, for intense heat, or located to the sides of the spit 38, for indirect heat. And the charcoal tray 78 being removable eases the cleanup of the cooker 10 after use. Each charcoal tray 78 has a bottom and includes a charcoal screen 94 spaced apart from the charcoal tray bottom to help space the charcoal away from the charcoal tray bottom. This improves upon the efficient burning of the charcoal. In the illustrated embodiment, the fire pan 14 also includes a second charcoal tray 78' that can be positioned over the gas tube 82, when the gas burner 74 is not in use, or elsewhere inside the fire pan 14.

The cooker 10 also includes a drip tray 98 in and extending along the center of the fire pan 14, and a drip outlet 102 communicating with the inside of the drip tray 98. A drip container (not shown) such as a bowl can be placed under the drip outlet 102 to collect food drippings. The charcoal trays 78 can slide over the drip pan 98 when being moved around inside the fire pan 14.

The cooker 10 also includes means for keeping the fire pan raised above the ground or other supporting surface. In the illustrated embodiment, the means for keeping the fire pan raised above the ground comprises a pair of spaced apart wheels 108 at one end of the fire pan 14, and a handle 112 at the other end of the fire pan 14. The wheels 108 and handle 112 also aid in the ready relocating of the cooker 10, as desired.

Figure 4:
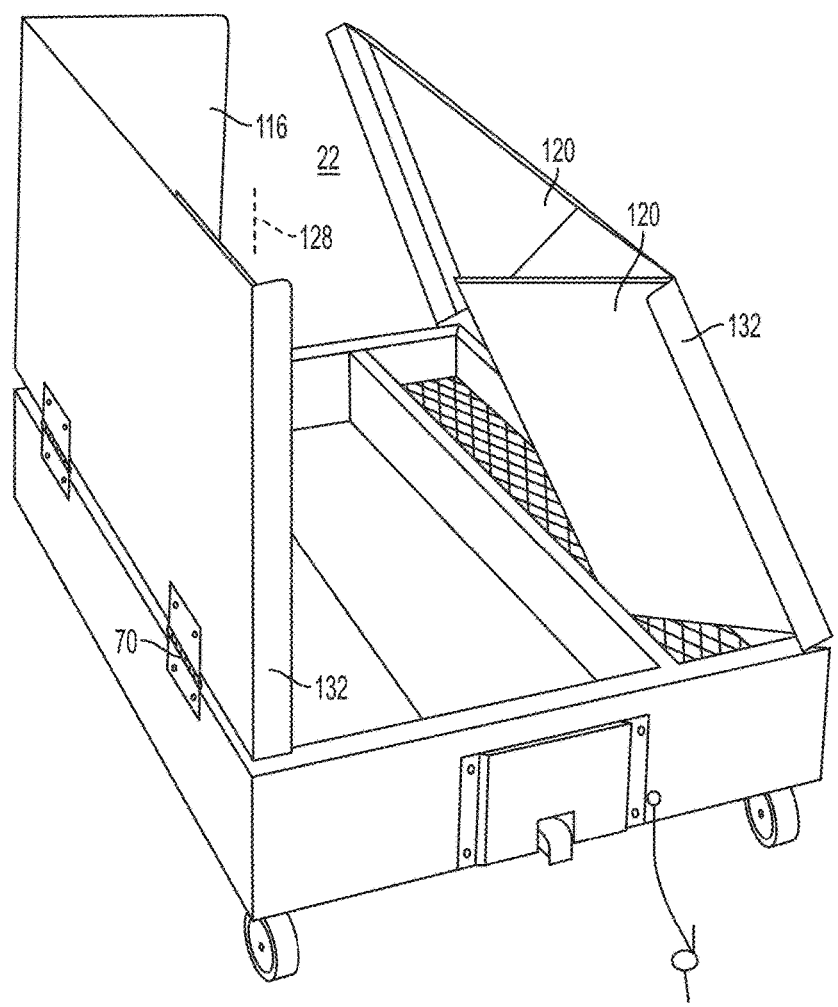
FIG. 4 is a top perspective view of the cooker of FIG. 1, with the front plate in its upward position, and the back plate moving to its upward position.
Figure 5:
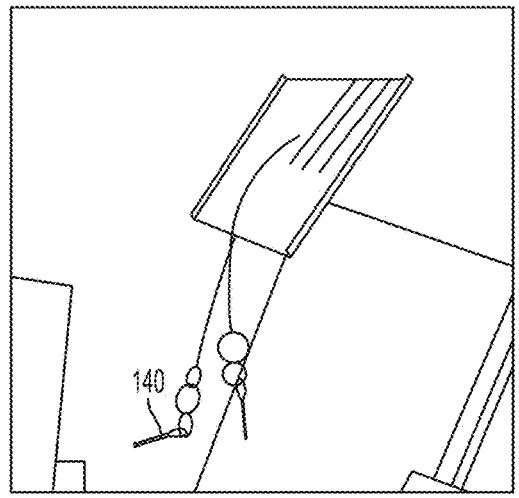
FIG. 5 is an end perspective view of the support rack in the cooker of FIG.

As illustrated in FIG. 9, each of the cooker side plates 34 include a forward plate 116 and a rearward plate 116, each plate being hinged by hinges 124 (see FIG. 10) to the respective one of the ends of the front 18 and back 22 plates, so that each plate is pivotable along an axis 128 (see FIG. 4) perpendicular to the fire pan 14. The side plates 34 attached to the front and back plates serve to enclose the cooker 10 for its use as an oven. And when at least one of the forward 116 or rearward 120 plates are in the up position, the side plate 34, as explained below, provides further support to the spit supporting support racks 26, and serves as a wind break to the spit 38. When storing and transporting the cooker 10, the forward 116 and rearward 120 side plates fold over the respective front 18 and back 22 plates so that all of the plates can be stored inside the fire pan 14.

Figure 7:
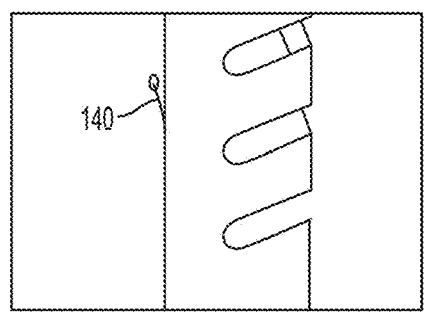
FIG. 7 is a view of the side of the cooker showing a pin being inserted into a hole.

In the illustrated embodiment, the ends of the front 18 and back 22 plates have perpendicularly extending flanges 132, extending along the axis 128 perpendicular to the fire pan 14, and outside of side plate hinges 124. The flanges 132 prevent the side plates from passing, past perpendicular to the outer edge of the respective front 18 and back 22 plates, away from the front 18 and back 22 plates. Further, the support racks 26 include notches 136 (see FIG. 8) for interlocking the support racks and side plates by receiving and holding the forward 116 and rearward 120 side plates in place. This provides additional support to the side plates 34 and support racks 26, and aids in the assembly of the cooker 10. The side plates 34 are adapted to be connected to the support racks 26 by pins 140 (see FIGS. 7 and 11) received in holes 144 in the side plates 34 and support racks 26, The cooker 10 thus provides for alternatively securing the cover 50 or the support racks 26 to the fire pan 14, to provide with the cover 50 a closed container for containing and storing all of the parts of the portable cooker 10; and to provide with the support racks 26 a support for the spit 38 above the fire pan 14. More particularly, the fire pan 14 has an open top 150, and the front 18 and back 22 plates are about coextensive with the fire pan open top 150 when pivoted down over the fire pan 14 for cooker storage and transportation. This makes the most use of all available space, both for maximizing the size of the cooker 10 and for its storage and transportation.

As shown, the cooker 10 can be put into its storage position, as shown in FIG. 1, and then readily moved from one location to another. This makes the cooker 10 ideal for being transported to various locations, such as tail gate events, and for providing pig roasts at various locations, among other uses. The cooker 10 can be of various lengths and widths, but is anticipated to be three-foot-long by two-foot-wide, or larger. This makes the cooker ideal for transport in standard motor vehicles.

Various other features of this disclosure are set forth in the following claims.

The invention claimed is:

1. A compact versatile portable cooker comprising: a fire pan of rectangular configuration and having a bottom and four sides and opposed ends; a pair of support racks adapted to support a spit so that the support racks extend perpendicular to the bottom, with each of the support racks being adapted to support the spit in the rack at different heights above the bottom by each of the support racks including a plurality of vertically spaced apart angled notches disposed vertically one above the other so that the spit can be positioned and held at various levels above the fire pan, the support racks each being adapted to be attached to the opposed ends of the fire pan, front and back plates attached to the fire pan, and at least two side plates, each of which is attached to an end of the opposed ends of one of the front and back plates, and each side plate is adapted to be attached to a respective one of the support racks and to extend vertically from the bottom.

2. A compact versatile portable cooker according to claim 1 wherein the front and back plates are hinged to the fire pan, and the side plates are hinged to the at least one of the front and back plates.

3. A compact versatile portable cooker according to claim 1 wherein each side plate comprises a forward plate and a rearward plate, each of said side plates plate being hinged to one of the ends of the front and rear plates along an axis perpendicular to the fire pan.

4. A compact versatile portable cooker according to claim 1 wherein the ends of the front and back plates have flanges extending perpendicularly to the fire pan and extending along the axis perpendicular to the fire pan and outside of the side plate hinges, so that the flanges prevent the side plates from passing past perpendicular to the front and side plates away from the front and back plates.

5. A compact versatile portable cooker according to claim 3 wherein the support racks further include notches for receiving and holding the forward and rear side plates in place.

6. A compact versatile portable cooker according to claim 1 wherein the side plates are adapted to be connected to the support racks by pins received in holes in the side plates and end support plates.

7. A compact versatile portable cooker according to claim 1 wherein the fire pan includes outside support rack receiving pockets, and wherein one end of each of the support racks is adapted to be received in a separate one of the fire pan pockets.

8. A compact versatile portable cooker according to claim 2 wherein the hinges connecting the front and back plates to the fire pan space the plates apart from the fire pan to provide vents for allowing air into the inside of the cooker.

9. A compact versatile portable cooker according to claim 1 and further including means for keeping the fire pan raised above the ground or other supporting surface.

10. A compact versatile portable cooker according to claim 9 wherein said means for keeping the fire pan raised above the ground comprises a pair of spaced apart wheels at one end of the fire pan and a handle at the other end of the fire pan.

11. A compact versatile portable cooker according to claim 1 and further including a cover dimensioned to fit over the front, back, end and side plates to enclose the top of the cooker.

12. A compact versatile portable cooker according to claim 1 wherein the fire pan has an open top, and wherein the front and back plates are about coextensive with the fire pan open top.

* * * * *